United States Patent
Struik

(10) Patent No.: US 9,667,634 B2
(45) Date of Patent: *May 30, 2017

(54) METHOD AND APPARATUS FOR PROVIDING AN ADAPTABLE SECURITY LEVEL IN AN ELECTRONIC COMMUNICATION

(71) Applicant: Certicom Corp., Mississauga (CA)

(72) Inventor: Marinus Struik, Toronto (CA)

(73) Assignee: Certicom Corp., Mississauga, ON (CA)

( * ) Notice: Subject to any disclaimer, the term of this patent is extended or adjusted under 35 U.S.C. 154(b) by 385 days.

This patent is subject to a terminal disclaimer.

(21) Appl. No.: 14/170,213

(22) Filed: Jan. 31, 2014

(65) Prior Publication Data

US 2014/0201521 A1    Jul. 17, 2014

Related U.S. Application Data

(63) Continuation of application No. 11/735,055, filed on Apr. 13, 2007, now Pat. No. 8,688,978.

(60) Provisional application No. 60/791,434, filed on Apr. 13, 2006.

(51) Int. Cl.
   *H04L 29/06* (2006.01)

(52) U.S. Cl.
   CPC ............ *H04L 63/105* (2013.01); *H04L 63/12* (2013.01); *H04L 63/1441* (2013.01); *H04L 63/20* (2013.01); *H04L 63/0227* (2013.01)

(58) Field of Classification Search
   CPC ... H04L 63/105; H04L 63/20; H04L 63/1441; H04L 63/12; H04L 63/0227
   See application file for complete search history.

(56) References Cited

U.S. PATENT DOCUMENTS

| | | |
|---|---|---|
| 5,099,517 A | 3/1992 | Gupta et al. |
| 5,301,287 A | 4/1994 | Herrell et al. |
| 5,450,493 A | 9/1995 | Maher |
| 5,559,883 A | 9/1996 | Williams |
| 5,615,261 A | 3/1997 | Grube et al. |
| 5,638,448 A | 6/1997 | Nguyen |
| 5,689,566 A | 11/1997 | Nguyen |
| 5,832,228 A | 11/1998 | Holden et al. |
| 6,044,062 A * | 3/2000 | Brownrigg ............ H04L 29/06 370/238 |
| 6,101,543 A | 8/2000 | Alden et al. |

(Continued)

FOREIGN PATENT DOCUMENTS

| | | |
|---|---|---|
| EP | 1320010 | 6/2003 |
| EP | 1324541 | 7/2003 |

(Continued)

OTHER PUBLICATIONS

SunScreen 3.2 Administrator's Overview, Sep. 2001, pp. 1-356.*

(Continued)

*Primary Examiner* — Michael Pyzocha
(74) *Attorney, Agent, or Firm* — Fish & Richardson P.C.

(57) ABSTRACT

A method of communicating in a secure communication system, comprises the steps of assembling a message at a sender, then determining a frame type, and including an indication of the frame type in a header of the message. The message is then sent to a recipient and the frame type used to perform a policy check.

18 Claims, 8 Drawing Sheets

(56) References Cited

U.S. PATENT DOCUMENTS

| | | | |
|---|---|---|---|
| 6,108,583 A * | 8/2000 | Schneck | H04L 63/105 700/67 |
| 6,118,775 A | 9/2000 | Kari et al. | |
| 6,249,820 B1 | 6/2001 | Dobbins | |
| 6,272,632 B1 | 8/2001 | Carman et al. | |
| 6,292,900 B1 | 9/2001 | Ngo | |
| 6,493,824 B1 * | 12/2002 | Novoa | H04L 12/12 709/203 |
| 6,510,349 B1 | 1/2003 | Schneck et al. | |
| 6,516,416 B2 | 2/2003 | Gregg | |
| 6,697,857 B1 | 2/2004 | Dixon | |
| 6,728,243 B1 * | 4/2004 | Jason, Jr. | H04L 45/00 370/389 |
| 6,760,768 B2 | 7/2004 | Holden et al. | |
| 6,782,473 B1 | 8/2004 | Park | |
| 6,792,111 B1 | 9/2004 | Italia | |
| 6,865,426 B1 | 3/2005 | Schneck et al. | |
| 6,918,034 B1 | 7/2005 | Sengodan et al. | |
| 6,928,544 B2 | 8/2005 | Chu | |
| 7,016,948 B1 * | 3/2006 | Yildiz | H04W 24/08 709/221 |
| 7,023,863 B1 | 4/2006 | Naudus et al. | |
| 7,024,609 B2 | 4/2006 | Wolfgang et al. | |
| 7,031,309 B1 | 4/2006 | Sautter | |
| 7,036,015 B2 | 4/2006 | Vanstone et al. | |
| 7,107,335 B1 | 9/2006 | Arcieri et al. | |
| 7,143,137 B2 | 11/2006 | Maufer et al. | |
| 7,233,948 B1 | 6/2007 | Shamoon et al. | |
| 7,290,288 B2 | 10/2007 | Gregg | |
| 7,302,564 B2 | 11/2007 | Berlin | |
| 7,412,726 B1 | 8/2008 | Viswanath | |
| 7,437,548 B1 | 10/2008 | Alfieri | |
| 7,447,313 B2 | 11/2008 | Van Rijnsoever | |
| 7,467,406 B2 | 12/2008 | Cox et al. | |
| 7,526,807 B2 | 4/2009 | Chao et al. | |
| 7,600,038 B2 | 10/2009 | Struik | |
| 7,657,531 B2 | 2/2010 | Bisbee et al. | |
| 7,660,986 B1 | 2/2010 | Qiu et al. | |
| 7,721,324 B1 * | 5/2010 | Jackson | H04L 41/28 709/225 |
| 7,965,843 B1 | 6/2011 | Maino et al. | |
| 8,069,483 B1 * | 11/2011 | Matlock | H04W 12/12 713/154 |
| 9,172,629 B1 * | 10/2015 | McRae | H04L 45/00 |
| 2001/0043577 A1 | 11/2001 | Barany et al. | |
| 2002/0035635 A1 | 3/2002 | Holden et al. | |
| 2002/0090086 A1 | 7/2002 | Van Rijnsoever | |
| 2002/0094087 A1 | 7/2002 | Dellmo et al. | |
| 2002/0174352 A1 | 11/2002 | Dahl | |
| 2002/0176433 A1 | 11/2002 | Zhu et al. | |
| 2002/0181498 A1 | 12/2002 | Hsu et al. | |
| 2003/0012163 A1 * | 1/2003 | Cafarelli | H04L 1/1607 370/338 |
| 2003/0026255 A1 | 2/2003 | Poeluev et al. | |
| 2003/0035542 A1 | 2/2003 | Kim | |
| 2003/0119484 A1 * | 6/2003 | Adachi | H04L 63/04 455/411 |
| 2003/0147369 A1 | 8/2003 | Singh et al. | |
| 2003/0156586 A1 * | 8/2003 | Lee | H04L 69/22 370/392 |
| 2003/0159036 A1 | 8/2003 | Walmsley et al. | |
| 2003/0226011 A1 | 12/2003 | Kuwano et al. | |
| 2004/0010691 A1 | 1/2004 | Nelson | |
| 2004/0028409 A1 | 2/2004 | Kim et al. | |
| 2004/0047324 A1 * | 3/2004 | Diener | H04L 1/1664 370/338 |
| 2004/0062224 A1 * | 4/2004 | Brownrigg | H04L 29/06 370/338 |
| 2004/0136527 A1 | 7/2004 | Struik | |
| 2004/0139312 A1 | 7/2004 | Medvinsky | |
| 2004/0218683 A1 * | 11/2004 | Batra | H04L 27/0008 375/261 |
| 2004/0223615 A1 | 11/2004 | Dhawan et al. | |
| 2004/0255001 A1 | 12/2004 | Oh et al. | |
| 2005/0015583 A1 | 1/2005 | Sarkkinen et al. | |
| 2005/0076197 A1 * | 4/2005 | Struik | H04L 63/105 713/151 |
| 2005/0081032 A1 | 4/2005 | Struik | |
| 2005/0086501 A1 | 4/2005 | Woo et al. | |
| 2005/0097357 A1 * | 5/2005 | Smith | H04L 63/083 726/4 |
| 2005/0108746 A1 | 5/2005 | Futagami et al. | |
| 2006/0050708 A1 * | 3/2006 | Shapiro | H04L 1/1664 370/394 |
| 2006/0064736 A1 | 3/2006 | Ahuja et al. | |
| 2006/0075480 A1 * | 4/2006 | Noehring | H04L 47/10 726/12 |
| 2006/0077997 A1 * | 4/2006 | Yamaguchi | H04L 12/2803 370/445 |
| 2006/0112431 A1 * | 5/2006 | Finn | H04L 63/08 726/22 |
| 2006/0136715 A1 * | 6/2006 | Han | H04L 63/126 713/151 |
| 2006/0140400 A1 | 6/2006 | Brown et al. | |
| 2006/0210071 A1 | 9/2006 | Chandran et al. | |
| 2006/0236365 A1 * | 10/2006 | Pham | H04L 63/105 726/1 |
| 2007/0058633 A1 | 3/2007 | Chen et al. | |
| 2007/0086397 A1 * | 4/2007 | Taylor | H04L 12/1868 370/338 |
| 2007/0160059 A1 | 7/2007 | Poeluev et al. | |
| 2007/0195788 A1 | 8/2007 | Vasamsetti et al. | |
| 2007/0255954 A1 | 11/2007 | Struik | |
| 2008/0177997 A1 | 7/2008 | Morais et al. | |
| 2008/0307524 A1 | 12/2008 | Singh et al. | |
| 2009/0290635 A1 * | 11/2009 | Kim | H04N 19/159 375/240.02 |
| 2009/0319775 A1 * | 12/2009 | Buer | H04L 63/0428 713/153 |
| 2011/0106956 A1 * | 5/2011 | Luo | H04L 29/06 709/228 |
| 2011/0209196 A1 | 8/2011 | Kennedy | |
| 2011/0264915 A1 | 10/2011 | Cam-Winget et al. | |

FOREIGN PATENT DOCUMENTS

| | | |
|---|---|---|
| EP | 1326157 | 7/2003 |
| WO | 00/10304 | 2/2000 |
| WO | 03/036857 | 5/2003 |
| WO | 2005081032 | 4/2005 |
| WO | 2005/083970 | 9/2005 |

OTHER PUBLICATIONS

Notice of Allowance issued in U.S. Appl. No. 11/735,055 on Nov. 25, 2013; 23 pages.

Communication Pursuant to Article 94(4) EPC issued in European Application No. 07719535.2 on Feb. 7, 2014; 7 pages.

Office Action issued in Korean Application No. 10-2008-7027745 on Mar. 10, 2014; 5 pages. No translation.

Kent, Stephen T. "Internet privacy enhanced mail." Communications of the ACM 36.8 (1993): 48-60.

Canadian Office Action in Canadian Application No. 2,644,015, dated Jan. 22, 2015, 5 pages.

Korean Office Action in Korean Application No. 10-2008-7027745, dated Sep. 23, 2014, 3 pages.

Korean Notice of Allowance in Korean Application No. 10-2008-7027745, dated Feb. 5, 2015, 3 pages.

United States Office Action in U.S. Appl. No. 14/152,055, dated Mar. 13, 2015, 24 pages.

Li, Renqi, and E. A. Unger. "Security issues with TCP/IP." ACM SIGAPP Applied Computing Review 3.1 (1995): 6-13.

LeMay, Michael D., and Jack SE Tan. "Comprehensive message control and assurance with the secure email transport protocol." Electro/Information Technology Conference, 2004. EIT2004. IEEE. IEEE, (2004): 272-280.

Dierks, T. et al.; "The TLS Protocol"; RFC 2246; IETF; Jan. 1999; pp. 23, 28-30.

(56) References Cited

OTHER PUBLICATIONS

Hura et al.; "Data and Computer Communications: Networking and Internetworking"; CRC Press, 2001; pp. 337, 450, 453, 467, 471, 483, 484, 485, 489, 491, 526, 599, 609, 617, 618, 621, 937, 1086, 1117, 1118, 1132.
IEEE Standard 802.11; Standard for Telecommunications and Information Exchange between Systems—Local and Metropolitan Networks—Specific Requirements—Part 11: Wireless LAN Medium Access Control (MAC) and Physical Layer (PHY) Specifications; IEEE Press; 1999; pp. 34-41, 50-58.
Kent, S. et al.; "IP Authentication Header"; RFC 2402; IETF; Nov. 1998; 21 pages.
Kent, S. et al.; "Security Architecture for the Internet Protocol"; RFC 2401; IETF; Nov. 1998; 62 pages.
Specification of the Bluetooth System; Specification vol. 1—Core, Version 1.0B; Dec. 1, 1999; p. 160.
Sung et al.; "Design and Evaluation of Adaptive Secure Protocol for E-Commerce"; Proceedings of the 10th International Conference on Computer Communications and Networks; Oct. 15-17, 2001; pp. 32-39.
"Transmission Control Protocol"; RFC 0793; Darpa Internet Program; Information Sciences Institute; University of Southern California; Sep. 1981.
Office Action issued in U.S. Appl. No. 10/885,115 on Aug. 22, 2007; 10 pages.
Office Action issued in U.S. Appl. No. 10/885,115 on Jun. 23, 2008; 13 pages.
Advisory Action issued in U.S. Appl. No. 10/885,115 on Aug. 28, 2008; 3 pages.
Office Action issued in U.S. Appl. No. 10/885,115 on Oct. 27, 2008; 16 pages.
Office Action issued in U.S. Appl. No. 10/885,115 on May 8, 2009; 18 pages.
Office Action issued in U.S. Appl. No. 10/885,115 on Oct. 2, 2009; 16 pages.
Office Action issued in U.S. Appl. No. 10/885,115 on Jun. 4, 2010; 13 pages.
Advisory Action issued in U.S. Appl. No. 10/885,115 on Aug. 25, 2010; 3 pages.
Office Action issued in U.S. Appl. No. 10/885,115 on Jan. 21, 2011; 13 pages.
Office Action issued in U.S. Appl. No. 10/885,115 on Oct. 11, 2011; 14 pages.
Office Action issued in U.S. Appl. No. 10/885,115 on Jul. 1, 2013; 17 pages.
Office Action issued in U.S. Appl. No. 10/885,115 on Jan. 15, 2014; 24 pages.
Office Action issued in U.S. Appl. No. 10/921,161 on Mar. 25, 2008; 24 pages.
Office Action issued in U.S. Appl. No. 10/921,161 on Nov. 25, 2008; 30 pages.
Office Action issued in U.S. Appl. No. 10/921,161 on Dec. 9, 2009; 25 pages.
Office Action issued in U.S. Appl. No. 10/921,161 on Aug. 18, 2010; 27 pages.
Office Action issued in U.S. Appl. No. 10/921,161 on Jan. 27, 2011; 30 pages.
Examiner's Answer to Appeal Brief issued in U.S. Appl. No. 10/921,161 on Feb. 21, 2012; 30 pages.
Notice of Allowance issued in U.S. Appl. No. 10/921,161 on Apr. 12, 2012; 9 pages.
Office Action issued in U.S. Appl. No. 13/551,869 on Apr. 2, 2013; 11 pages.
Notice of Allowance issued in U.S. Appl. No. 13/551,869 on Sep. 27, 2013; 9 pages.
Office Action issued in U.S. Appl. No. 11/735,055 on Jul. 13, 2010; 21 pages.
Office Action issued in U.S. Appl. No. 11/735,055 on Dec. 22, 2010; 14 pages.
Office Action issued in U.S. Appl. No. 11/735,055 on Feb. 17, 2012; 14 pages.
Office Action issued in U.S. Appl. No. 11/735,055 on Dec. 11, 2012; 15 pages.
Office Action issued in U.S. Appl. No. 11/735,055 on May 24, 2013; 16 pages.
Office Action issued in Canadian Application No. 2,434,992 on Sep. 14, 2011; 3 pages.
Office Action issued in Canadian Application No. 2,434,992 on Dec. 5, 2012; 2 pages.
Notice of Allowance issued in Canadian Application No. 2,434,992 on Dec. 9, 2013; 1 page.
Office Action issued in Canadian Application No. 2,478,274 on Feb. 3, 2012; 2 pages.
Office Action issued in Canadian Application No. 2,478,274 on Mar. 14, 2013; 3 pages.
Office Action issued in Canadian Application No. 2,478,274 on Jan. 7, 2014; 2 pages.
Office Action issued in Canadian Application No. 2,644,015 on May 23, 2012; 3 pages.
Office Action issued in Canadian Application No. 2,644,015 on Nov. 4, 2013; 4 pages.
Office Action issued in Chinese Application No. 200780020042.X on Jan. 14, 2004; 10 pages.
Office Action issued in Chinese Application No. 200780020042.X on Mar. 21, 2012; 10 pages.
Office Action issued in Chinese Application No. 200780020042.X on Aug. 13, 2012; 9 pages.
Office Action issued in Chinese Application No. 200780020042.X on Dec. 17, 2012; 7 pages.
Notice of Allowance issued in Chinese Application No. 200780020042.X on May 6, 2013; 4 pages.
Search Report issued in U.K. Application No. 0418565.8 on Jan. 25, 2005; 4 pages.
Examination Report issued in U.K. Application No. 0418565.8 on Oct. 31, 2005; 7 pages.
Examination Report issued in U.K. Application No. 0418565.8 on Feb. 15, 2006; 2 pages.
Examination Report issued in U.K. Application No. 0418565.8 on Aug. 23, 2006; 3 pages.
Combined Search and Examination Report issued in U.K. Application No. 0623685.5 on Mar. 16, 2007; 5 pages.
Combined Search and Examination Report issued in U.K. Application No. 0721922.3 on Dec. 18, 2007; 5 pages.
Examination Report issued in German Application No. 102004040312.0 on Oct. 24, 2012; 15 pages.
Extended European Search Report issued in European Patent Application No. 07719535.2 on May 13, 2011; 6 pages.
Communication Pursuant to Article 94(4) EPC issued in European Application No. 07719535.2 on Feb. 17, 2012; 5 pages.
Communication Pursuant to Article 94(4) EPC issued in European Application No. 07719535.2 on Mar. 8, 2013; 5 pages.
Official Action issued in Japanese Application No. 2009-504535 on Aug. 17, 2011; 9 pages.
Notice of Allowance issued in Japanese Application No. 2009-504535 on Dec. 13, 2011; 3 pages.
Notice of Allowance issued in Japanese Application No. 2011-251567 on Apr. 23, 2013; 3 pages.
Office Action issued in Korean Application No. 10-2008-7027745 on Jun. 28, 2013; 6 pages.
International Search Report and Written Opinion of the International Searching Authority issued in International Application No. PCT/CA2007/000608 on Aug. 28, 2007; 4 pages.
Cam-Winget et al. "Security Flaws in 802.11 Data Link Protocols" Communications of the ACM 46.5 (May 2003) pp. 35-39.
Oppliger; "Security at the Internet Layer" Computer 31.9 (1998) pp. 43-47.
Notice of Allowance issued in U.S. Appl. No. 10/885,115 on Jun. 11, 2014.
Kim et al.; "Internet Multicast Provisioning Issues for Hierarchical Architecture," Oct. 2001, Proceedings of the Ninth IEEE International Conference on Networks, pp. 401-404.

(56) References Cited

OTHER PUBLICATIONS

Office Action issued in Chinese Application No. 201310067350.5 on May 4, 2016.

* cited by examiner

METHOD AND APPARATUS FOR PROVIDING AN ADAPTABLE SECURITY LEVEL IN AN ELECTRONIC COMMUNICATION

This application is a continuation of U.S. patent application Ser. No. 11/735,055 filed on Apr. 13, 2007, which claims priority from U.S. Patent Application No. 60/791,434 filed on Apr. 13, 2006. The entire contents of both priority documents are incorporated herein by reference.

FIELD OF THE INVENTION

The present invention relates to a method and apparatus for providing an adaptable security level in an electronic communication.

DESCRIPTION OF THE PRIOR ART

In electronic communications, it is often necessary to prevent an eavesdropper from intercepting a message. It is also desirable to have an indication of the authenticity of a message, that is a verifiable identification of the sender. These goals are usually achieved through the use of cryptography. Private key cryptography requires sharing a secret key prior to initiating communications. Public key cryptography is generally preferred as it does not require such a shared secret key. Instead, each correspondent has a key pair including a private key and a public key. The public key may be provided by any convenient means, and does not need to be kept secret.

There are many variations in cryptographic algorithms, and various parameters that determine the precise implementation. In standards for wireless communications, it has been customary to set these parameters in advance for each frame type. However, this approach limits the flexibility of the parameters.

When one device is communicating with several other devices, it will often need to establish separate parameters for each communication.

It is an object of the present invention to obviate or mitigate the above disadvantages.

SUMMARY OF THE INVENTION

In one aspect, there is provided a method of communicating between a first correspondent and a second correspondent in a data communication system comprising assembling a data stream at said first correspondent, said data stream having at least one frame, said frame having a header and data; incorporating in said header, an indication of a frame type; and forwarding said frame to said second correspondent to enable said second correspondent to determine the acceptability of said frame according to said frame type.

In another aspect, there is provided a method of verifying a communication between a first correspondent and a second correspondent in a data communication system comprising said second correspondent: receiving from said first correspondent, a frame having a header and data, said header including an indication of a frame type; determining said frame type from said header; and correlating said frame type to a policy to determine if said frame type is acceptable for at least one attribute of said frame.

In yet another aspect, there is provided a method of communicating between a pair of correspondents in a data communication system comprising exempting one of said pair of correspondents from security rules associated with said communication system to enable said one correspondent to initialize communication with the other of said correspondents.

BRIEF DESCRIPTION OF THE DRAWINGS

An embodiment of the invention, will now be described by way of example only with reference to the accompanying drawings in which.

DESCRIPTION OF THE PREFERRED EMBODIMENTS

Figure 1:
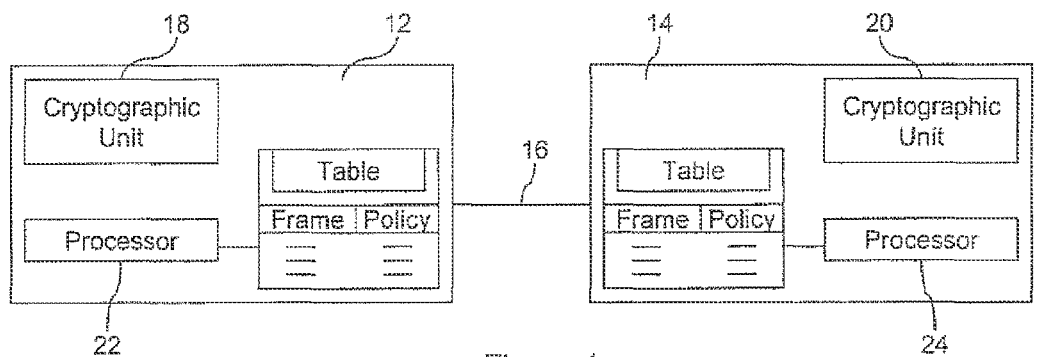
FIG. 1 is a schematic representation of a communication system.

Referring to FIG. 1, a communication system 10 includes a pair of correspondents 12, 14 connected by a communication link 16. Each, correspondent 12, 14 includes a respective cryptographic unit 18, 20.

Each correspondent 12, 14 can include a processor 22, 24. Each processor may be coupled to a display and to user input devices, such as a keyboard, mouse, or other suitable devices. If the display is touch sensitive, then the display itself can be employed as the user input device. A computer readable storage medium (not shown) is coupled to each processor 22, 24 for providing instructions to the processor 22, 24 to instruct and/or configure processor 22, 24 to perform steps or algorithms related to the operation of each correspondent 12, 14, as further explained below. The computer readable medium, can include hardware and/or software such as, by way of example only, magnetic disks, magnetic tape, optically readable medium such as CD ROM's, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM provided in a support system. It should be noted that the above listed example mediums can be used either alone or in combination.

In order to transfer data between the correspondents 12, 14, a packet stream 30 is assembled at one of the correspondents in accordance with a defined protocol. The packet stream 30 is shown schematically in FIG. 2 and is composed of one or more frames 31, each of which has a header 32 and data 34. In some protocols, the packet may itself be organised as a frame with a header 32a and the data 34a consisting of a collection of individual frames. The header 32 is made up of a string of bits and contains control information at specified locations within the bit stream.

Included in each of the headers 34 are security control bits 33, that include a security mode bit 35 and integrity level bits 36,37.

In this embodiment, security mode bit 35 is used to indicate whether encryption is on or off. Integrity level bits 36 and 37 together are used to indicate which of four integrity levels, such as 0, 32, 64, or 128 bit key size is utilised. The security mode bit 35 may be used to indicate alternative modes of operation, such as, authentication and the number of bits may be increased (or decreased) to accommodate different combinations. It will be recognized that providing security bits in each frame 31 of the stream 30 allows the security level to be on a frame-by-frame basis rather than on the basis of a pair of correspondents, therefore providing greater flexibility in organizing communications.

In order to provide security, certain minimum security levels may be used. These levels should be decided upon among all of the correspondents through an agreed-upon rule. This rule may be either static or dynamic.

Figure 4:
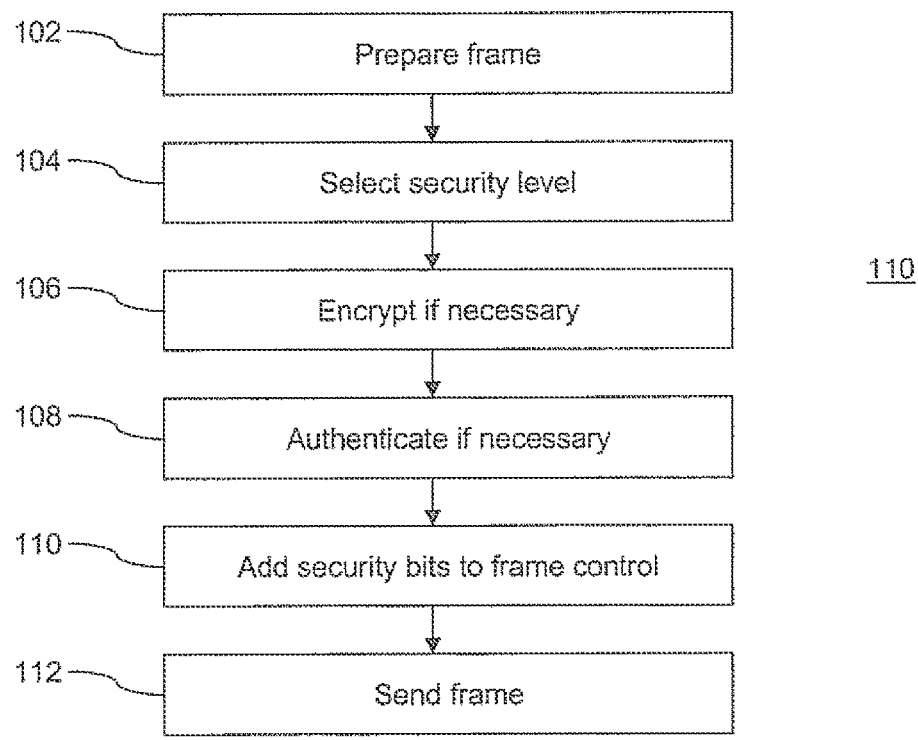
FIG. 4 is a schematic representation of a method performed by a sender in FIG. 1.

In operation, the correspondent 12 performs the steps shown in FIG. 4 by the numeral 100 to send information to the correspondent 14. First, the correspondent 32 prepares data and a header at step 102. Then it selects the security level at step 104. The security level is determined by considering the minimum security level required by the recipient, the nature of the recipient, and the kind of data being transmitted. If the security level includes encryption, then the correspondent 12 encrypts the data at step 106. If the security level includes authentication, then the correspondent 12 signs the data at step 108. Then the correspondent 12 includes bits indicating the security mode and security level in the frame control at step 110. The correspondent 12 then sends the frame to the correspondent 14 at step 112.

Figure 5:
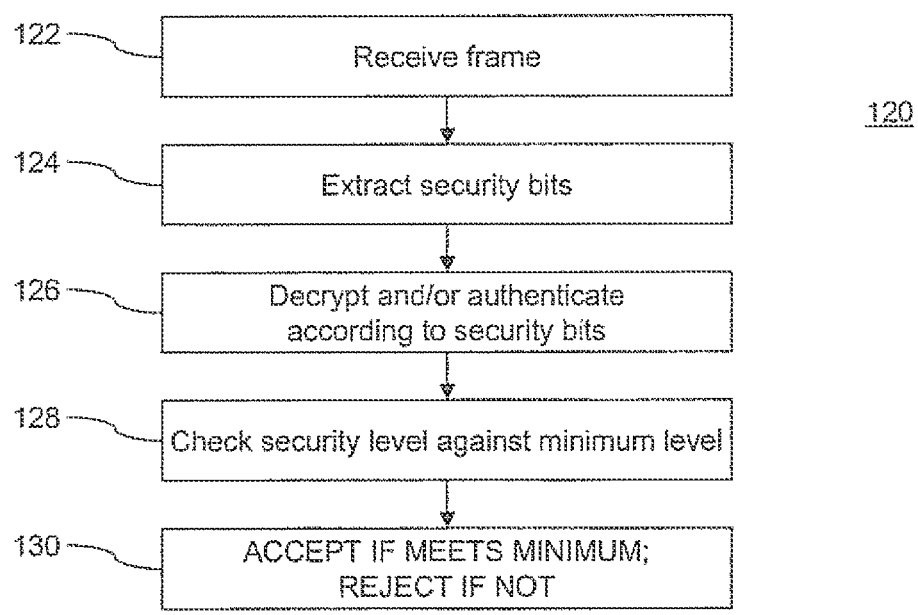
FIG. 5 is a schematic representation of a method performed by a recipient in FIG. 1.

Upon receiving the frame, the correspondent 14 performs the steps shown in FIG. 5 by the numeral 120. The correspondent 14 first receives the frame at step 122. It then extracts the security bits at step 124. If the mode security bits 34 indicate encryption, then the correspondent 14 decrypts the data at step 126. If the security bits indicate authentication, then the correspondent 14 verifies the signature at step 126. Finally, the correspondent 14 checks the security level to ensure it meets predetermined minimum requirements at step 128. If either the encryption or authentication fails, or if the security level does not meet the minimum requirements, then the correspondent 14 rejects the message and, if the encryption and authentication do not fail, and the security level meets the minimum requirements then the message is accepted, at step 130.

It will be recognized that providing security bits and an adjustable security level provides flexibility in protecting each frame of the communication. It is therefore possible for the sender to decide which frames should be encrypted but not authenticated. Since authentication typically increases the length of a message, this provides a savings in constrained environments when bandwidth is at a premium.

In a further embodiment, the correspondent 12 wishes to send the same message to multiple recipients 14 with varying minimum security requirements. In this case, the correspondent 12 chooses a security level high enough to meet all of the requirements. The correspondent 12 then proceeds as in FIG. 4 to assemble and send a message with the security level. The message will be accepted by each recipient since it meets each of their minimum requirements. It will be recognized that this embodiment provides greater efficiency than separately dealing with each recipient's requirements.

In another embodiment, a different number of security bits are used. The actual number of bits is not limited to any one value, but rather may be predetermined for any given application. The security bits should indicate the algorithm parameters. They may be used to determine the length of a key as 40 bits or 128 bits, the version of a key to be used, or any other parameters of the encryption system.

Figure 6:
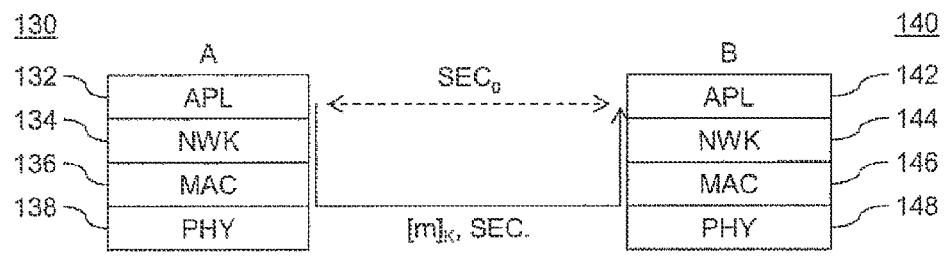
FIG. 6 is a schematic representation of a network protocol used in one embodiment of the communication system.

It will be recognized that in the above embodiments, a network stack may be used to organize communications between the correspondents. Referring therefore to FIG. 6, the a network stack of correspondent A is shown by the numeral 130. A network stack of correspondent B is shown by the numeral 140. The network stacks are organized into layers and have similar structures. The network stack 130 includes an application layer (APL) 132, a network layer (NWK) 134, a message authentication layer (MAC) 136, and a physical layer (PHY) 138. The network stack 140 includes similar components with similar numbering.

The sender determines how he wants to protect payload (and where to protect it, i.e., which layer). For the APL layer, security should be transparent; its role is limited to indicating at which level it wants to protect data (i.e., security services: none, confidentiality, data authenticity, or both). The actual cryptographic processing then is delegated to lower layers.

The recipient determines whether or not to accept protected payload, based on the received frame and locally maintained status information. The outcome of the cryptographic processing (done at the same layer as that of the sender), including info on the apparently offered protection level, is passed to the application layer, who determines whether the offered protection level, was adequate. The recipient may acknowledge proper receipt of the frame to the original sender, based on this 'adequacy test'.

The acknowledgement (ACK), if present, is then passed back to the sender and passed up to the appropriate level (if protected message sent at APL layer, then ACK should also arrive back at that level; similar for lower layers of coarse).

The sender A determines that it wants to protect payload m using the protection level indicated by SEC (taking into account its own security needs and, possibly, those of its intended recipients). The payload m and desired protection level SEC is then passed to a lower layer (e.g., the MAC layer, as in the diagram) which takes care of the actual cryptographic processing. (This message passing could include additional status information that aids in the processing of the frame, such as the intended recipient(s), fragmentation info, etc. Note that the delegation of the cryptographic processing to a lower layer is only a conceptual step if cryptographic processing takes place at the same layer at which the payload m originates.)

Cryptographic processing involves protecting the payload m and, possibly, associated information such as frame headers, using the cryptographic process indicated by the desired protection level SEC. The key used to protect this information is derived from shared keying material maintained between the sender and the intended recipient(s). After cryptographic processing, the protected frame, indicated by [m]K., SEC in FIG. 6, is communicated to the intended recipient(s) B.

The intended recipient (s) retrieves the payload m' from the received protected frame, using the cryptographic process indicated by the observed protection level SEC, using a key that is derived from shared keying material maintained between the sender and the recipient(s) in question. The retrieved payload m' and the observed protection level SEC' is passed to the same level at which the payload was originated by the sender, where the adequacy of the observed protection level is determined. The observed protection level SEC' is deemed sufficient, if it meets or exceeds the expected protection level $SEC_0$, where the parameter $SEC_0$ might be a fixed pre-negotiated protection level that does or does not depend on the retrieved payload m' in question. (Defining $SEC_0$ in a message-dependent way would allow fine-grained access control policies, but generally involves increased storage and processing requirements.)

The above approach works in contexts where expected and observed protection levels can be compared, e.g., where the set of protection levels is a partial ordering or where a membership test is performed (one of a set of protection levels). One example is the context where protection involves a combination of encryption and/or authentication, with as ordering the Cartesian product of the natural ordering for encryption (encryption OFF<Encryption ON) and the natural ordering of authentication, (ordered according to increasing length of data authenticity field). Moreover, if the set of protection levels has a maximum element, then the sender can use this maximum protection level to ensure that (unaltered) messages always pass the adequacy test. In another example, the observed protection level is compared to $SEC_0$, where $SEC_0$ is a set of protection levels rather than only a minimum security level. In this way, if SEC0={None, Auth-32, Auth-64, Auth-128} and SEC=Auth-32, then the adequacy test would pass, whereas if SEC0 is the same as above and SEC=Auth-32+Confidentiality (e.g. encryption), then the adequacy test would fail.

In the above embodiments, each sender pre-negotiates the minimum expected protection level $SEC_0$ with each intended recipient. Thus, the approach might not be as adaptive as desirable for some applications and may involve additional protocol overhead at every change of the $SEC_0$ parameter. These disadvantages can be overcome by using the acknowledgement (ACK) mechanism from recipient(s) to sender as a feedback channel for passing the $SEC_0$ info. This is performed by incorporating in each acknowledgement message an indication as to the expected protection level. This information can then be collated by the original sender to update the minimum protection level expected by its recipients), whether or not this is message-dependent or not.

Figure 7:
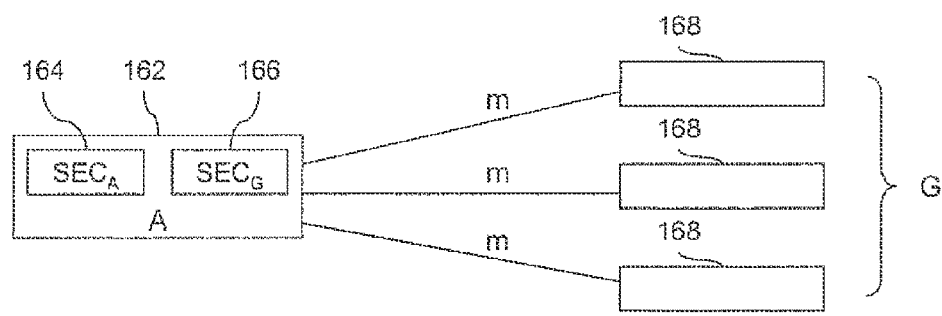
FIG. 7 is a schematic representation of an embodiment of the communication system.

In a further embodiment, a method of synchronizing security levels is shown. Referring to FIG. 7, another embodiment of the communication system is shown generally by the numeral 160. The system includes a sender A 162 and recipients 168 in a group labelled G. The sender A includes parameters $SEC_A$ 164 and $SEC_G$ 166.

Sender A wants to securely communicate a message m to a group G of devices. The sender A has access to the two parameters, e.g., (1) The minimum level $SEC_A$ at which it would like to protect this message (in general $SEC_A$ might depend on the group it sends information to and the message itself, so proper notation would be $SEC_A$ (m,G)); (2) The minimum protection level $SEC_G$ that the group G of recipients expects (again, the proper notation would be $SEC_G$(m, A) if this level would depend on the sender and the message itself as well). Here, the minimum expectation level of a group is the maximum overall group members of the minimum expectation level for each group member.

Initialization:
Sender A assumes that each parameter $SEC_G$ is set to the maximum protection level (for each group G it securely communicates with).

Operational Usage:
Sender A determines the minimum protection level $SEC_A$ at which it wants to protect the message m. The actual protection level SEC applied to the message m meets both its own adequacy test (i.e., $SEC \geq SEC_A$) and the minimum expected level by the group G (i.e., $SEC \geq SEC_G$).

Each recipient B that is in the group G of recipients (i.e., $B \in G$) indicates in its secure acknowledgement message the minimum expected protection level (for sender A and message m) at that particular moment of time.

A updates the parameter $SEC_G$ such that it is consistent with all the minimum protection levels indicated in each of the acknowledgement messages it received back (i.e., $SEC_G \geq SEC_B$ for all responding devices B).

Note that the procedure described above sends messages with a protection level that satisfies both the needs of the sender and expectations of recipients) and is adaptable to changes herein over time. Alternatively, the sender might only take its own protection needs into account, at the cost of potentially sending messages that will be rejected by one or more recipients due to insufficient—since less than expected—protection level.

The procedure described above can be generalized towards a general self-synchronization procedure for status information among devices in any network topology, where the feedback info on status information may be partially processed along the feedback path from recipient(s) towards sender already, rather than at the sender itself only (in the example above, this graph is a tree with root A and leaves the recipient(s) and the synchronization involves a specific security parameter).

Figure 8:
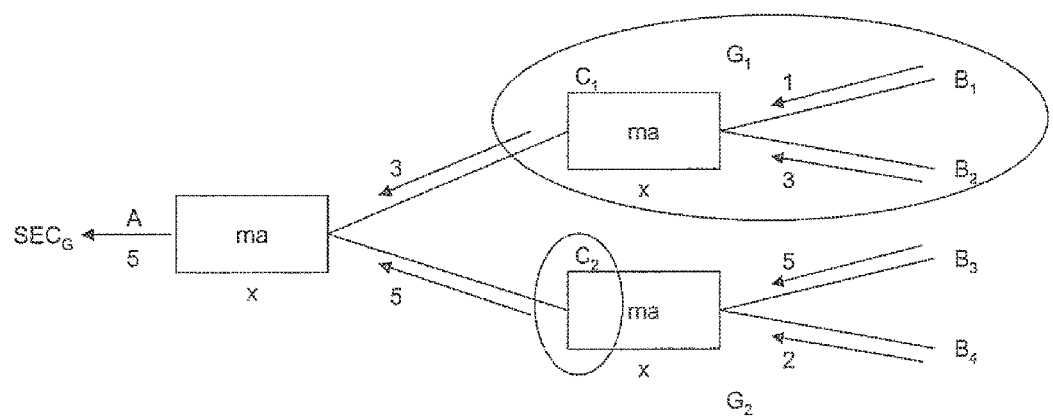
FIG. 8 is a schematic representation of another embodiment of the communication System.

As seen in FIG. 8, A sends a payload secured at protection level SEC to a group of devices consisting of B1-B4, The recipients B1-B4 provide feedback to the sender A on the expected protection level (indicated in the diagram as the integers 1, 3, 2, 5, where these integers are numbered in order of increasing protection level). The feedback is communicated back to A via intermediate nodes C1 and C2, who collect the respective feedbacks of devices in their respective groups G1 and G2 and process this, before returning a condensed acknowledge message representing both groups to sender A. The condensed feedbacks provided by these intermediate devices provides A with the same information on the minimum protection level that satisfies the expectations of all recipients as would have been the case if this information would have been forwarded to A without intermediate processing. (Here, we assume that the intermediate devices do not cheat in their calculations)

Figure 9:
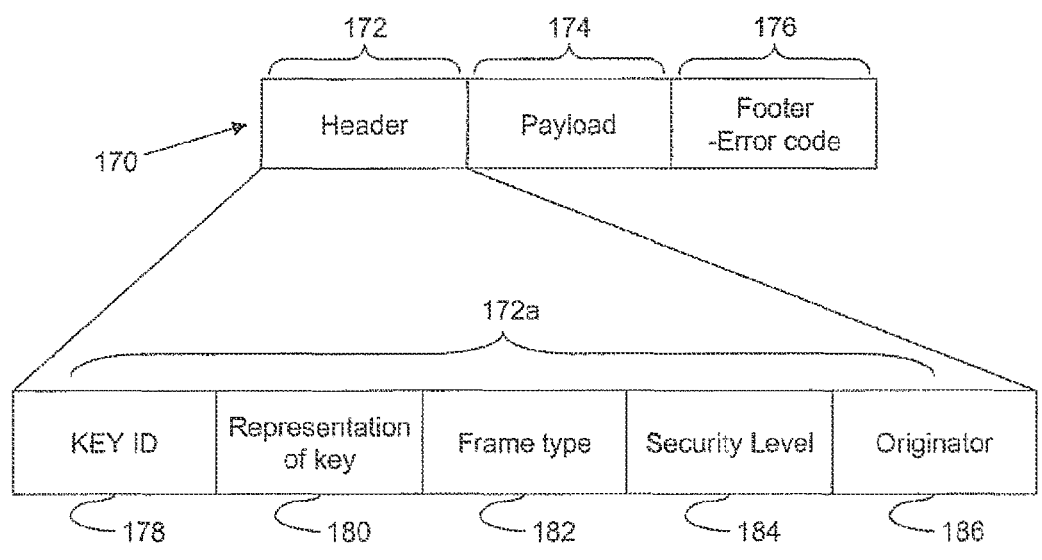
FIG. 9 is a schematic representation of another frame.

In another embodiment, each frame in the communication is structured as shown in FIG. 9 and is generally denoted by numeral 170. The frame 170 generally comprises a header 172, a payload 174 and a footer 176. The footer 176 typically comprises one or more bits that represent an error code. The payload 174 includes the data which is to be sent in that particular frame 170, e.g. a message.

An exemplary header 172*a* is also shown in greater detail in FIG. 9. The header 172*a* includes a key identifier 178, a representation of a key 180, a frame type 182, a security level 184 (as before) and an indication of the originator 186 of the message, e.g. the sender 12.

Each portion of header 172a contains one or more bits that represents a certain attribute of the transmission or includes a piece of information. The key identifier 178 and the representation of the key 180 are typically used to determine not only what key is to be used but also how the key is to be used, e.g. for broadcast or unicast communications.

The frame type 182 provides an indication as to what type of transmission is being sent in that particular frame 172a. Typical frame types 182 include data, command, acknowledgement and beacon frames. Data-type frames transmit data, command-type frames transmit commands, acknowledgement-type frames transmit information back to a sender, e.g., an acknowledgement from the recipient that a frame has been properly received, and beacon frames are typically used to divide a transmission into time intervals.

In order to provide security, in addition to providing a minimum security level for the recipient 14, the sender 12 includes the frame type 182 in the header 172a. The frame type 182 is used by the recipient 14 to perform a policy check to determine if the security level, key, key-usage, etc. are appropriate for the type of frame being transmitted. For example, inadequate security for a frame type that should normally include high security would be rejected.

Figure 10:
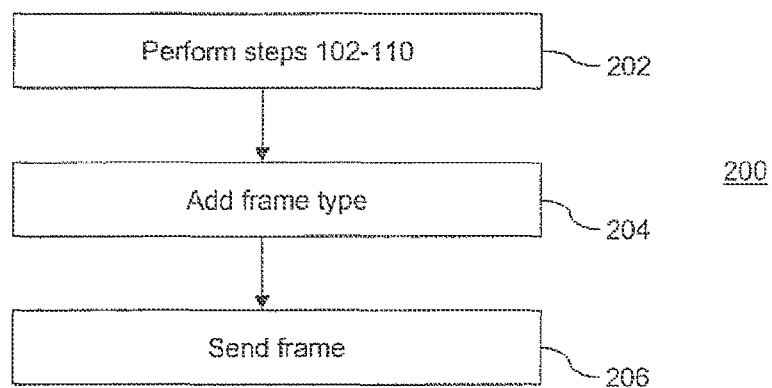
FIG. 10 is a schematic representation of a method performed by a sender using the frame of FIG. 9.

In operation, the sender 12 performs the steps shown in FIG. 10 by the numeral 200 to send information to the recipient 14. First the sender 12 prepares the frame at step 202 according to steps 102-110 discussed above. It will be appreciated that these steps would also include preparation of the header 172a to include the representation of the bits shown in FIG. 9. At step 204, the sender 12 determines the frame type 182 and includes one or more bits into the header 172a to indicate the frame type 182. The sender 12 then sends the frame 170 to the recipient 14 at step 206.

Figure 11:
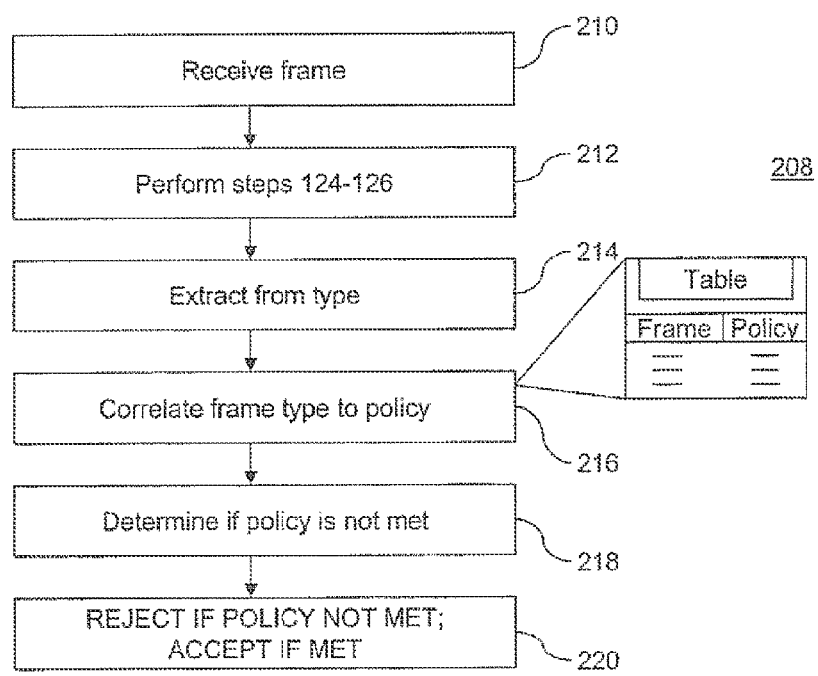
FIG. 11 is a schematic representation of a method performed by a recipient using the frame of FIG. 9.

Upon receiving the frame 170, the recipient 14 performs the steps shown in FIG. 11 by the numeral 208. The recipient 14 first receives the frame at step 210 and then performs the steps 124-126 discussed above at step 212. The recipient 14 then extracts the frame type 182 from the header 172a at step 214. The frame type 182 is then correlated to a policy in order to perform a policy check at step 216. In particular, a look-up-table is accessed by the recipient that indicates one or more policy for each frame type. The recipient 14 then determines if the policy is met at step 218 and either rejects or accepts the frame 170 at step 220 based on whether or not the policy is met.

Figure 2:
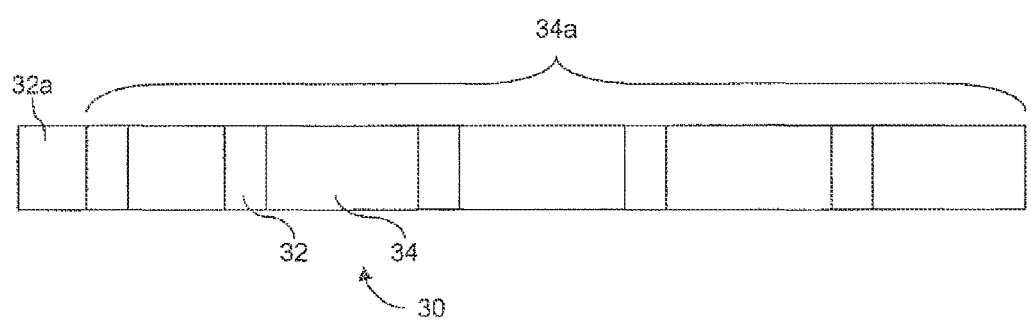
FIG. 2 is a schematic representation of an information frame exchanged in the communication system of FIG. 1.
Figure 3:
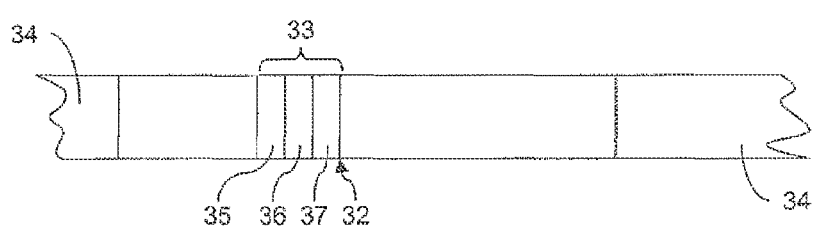
FIG. 3 is a schematic representation of a frame control portion of the frame of FIG. 2.

The policy check includes a correlation of the frame type 182 to some other data, preferably something included in the frame. For example, the policy may include certain correlations between key types and frame types such that, based on the representation of the key 160 the frame is accepted or rejected depending on whether or not the key is acceptable for use with the particular frame type 182. In the result, a certain type of key (or key usage) is required in order for the policy to be met. If the key is not of the correct type, then the frame 170 is not accepted by the recipient 14. If a single header 32a is used for multiple frames 34a as shown in FIG. 2 then the policy will also apply to the remaining frames in the message, In another example, the policy is set based on the security level 184 that is included in the frame 170, e.g. minimum security level $SEC_0$ discussed above. The frame 170 includes a certain minimum security level that has been included at the time when the header 172 is prepared by the sender 12, and this minimum security level is correlated to the particular frame type 162. If the security level 184 is suitable for the frame type 162 then the frame 170 is passed by the recipient at step 220 and if not it is rejected. It will be appreciated that the policy can be adapted to correlate any suitable information included in the frame with the frame type 182.

The above principles enable security checks to be adapted to various messages, frame types etc. in order to protect against combinations of security features that are more prone to an attack. For example, a policy can cause a recipient to reject a frame for using no encryption and only authentication, when that frame type is particularly vulnerable to an attack when encryption is not used.

In general there are three security level checks that possess different levels of granularity. The first is where $SEC_0$ is message independent. In this case, the minimum level of security is set once, and only one value needs to be stored locally for performing a policy check. However, where $SEC_0$ is message independent, a minimum granularity is provided since there is only one minimum security level for all messages and message types.

The second is where $SEC_0$ is completely message-dependent. In this case, a high level of granularity is provided since each message has its own minimum security level. However, this requires an enumeration of all messages and corresponding minimum security levels to be stored locally in a table.

The third is where $SEC_0$ is partially message dependent, namely, as discussed making reference to FIGS. 9-11, messages are divided into different types (e.g. by frame type) and, a minimum security level is allocated to each message type. This case balances the competing space requirements and granularity of performing a policy check based on the minimum security level. Typically, the number of messages/frame types is significantly less than the number of messages/frame types and thus more feasible to implement in a table.

Figure 12:
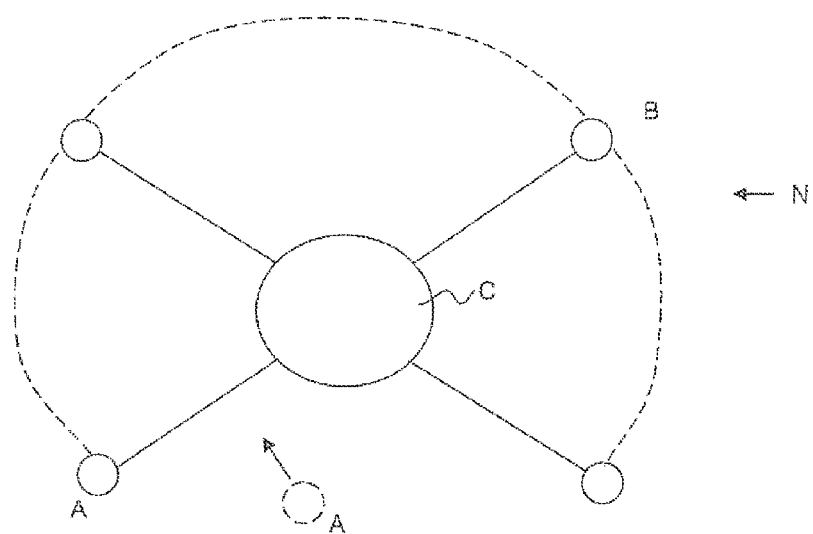
FIG. 12 is a schematic representation of another communication system.
Figure 13:
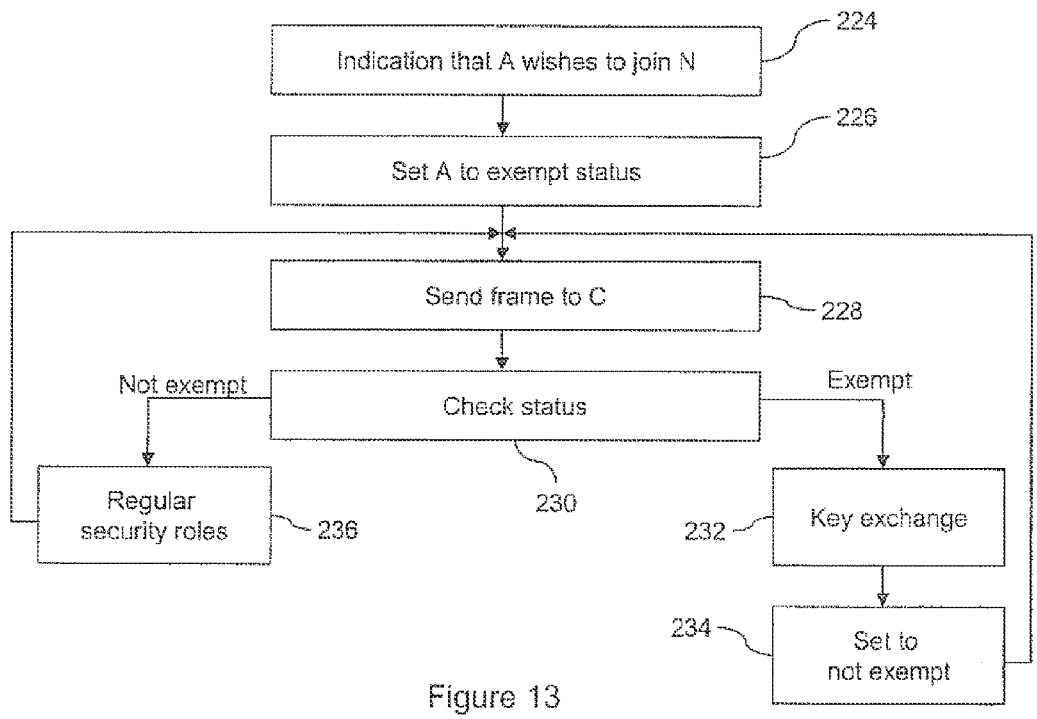
FIG. 13 is a schematic representation of a method performed by a correspondent in FIG. 12.

In another embodiment shown in FIG. 12 a network N comprises one or more correspondents (e.g. A, B) communicating through a central correspondent C. Correspondent A communicates over the network N by transmitting frames 150 to the central correspondent C using, e.g., any of the principles described above. When correspondent A first wishes to engage the network N, they do not have a key and thus cannot be authenticated to communicate in the network N. The general steps for an initialization procedure are shown in FIG. 13. The correspondent C first obtains an indication that A wishes to join the network N at step 224. This indication can be provided through a suitable registration procedure. Correspondent C then includes A in a table that indicates its status, and sets the status for correspondent A to "Exempt" at step 226. The exempt status takes into account that an initialization procedure is required so that correspondent A can communicate unsecurely until it has been initialized in the network N.

At step 228, correspondent A sends a frame to central correspondent C. Correspondent C checks the table at step 230. In this first communication, the status of correspondent A is exempt and a key exchange or other initialization procedure is carried out at step 232 and the status of correspondent A is then changed to "not exempt" (or an exempt indicator is removed, set to zero etc.) at step 234. Correspondent A then sends frames to correspondent C subject to normal security rules. At step 230 the status for correspondent A would thereafter be determined as not exempt and the regular security rules are applied at step 236, e.g. by checking the security level, frame type etc. It can be appreciated that A could also exempt C such that the roles are reversed and A is allowing C to communicate therewith (e.g. where A is part of another network).

In an example implementation of the network N shown in FIG. 12, the above minimum security level test takes into account the frame 150 and also the originator 186. In this case, the sender is correspondent A and the recipient is correspondent B. A check for the minimum security level would thus be SEC≥SEC$_B$(m,A). If the minimum security level is independent of originator A, this comes down to check SEC≥SEC$_B$(m), as discussed before. The same storage considerations as with original security level test would then be used (case 1).

If the minimum security level is completely dependent on the originator A, a minimum security level table is enumerated (dependent on frame m, frame type of m, or message dependent—as discussed before), but now for each originator (case 2). If the minimum security level is independent of originator A, except when originator is in an explicitly enumerated set of exempt devices, e.g. denoted by ExemptSet in the table, a single minimum security level table is implemented for devices outside the ExemptSet (potentially depending on frame type, etc.) and, additionally, a minimum security level table for each individual member of ExemptSet is implemented (case 3). Thus, if a correspondent (and device associated therewith) is part of the ExemptSet table, case 2 is utilized and, if no device is in the ExemptSet table, case 1 is utilized.

Case 3 can be made more implementation-friendly if correspondents in the ExemptSet table, a minimum security level table that is independent of the particular device in the ExemptSet is used. This requires that one security level table is implemented for devices that are not in the ExemptSet table and one table is implemented for devices that are in the ExemptSet table (case 4).

A further optimization of case 4 is where, for all devices in the ExemptSet table, the minimum security level—which is potentially message or message type dependent (as discussed before)—is either set to the minimum security level that holds for all devices that are outside ExemptSet or is set to a prespecified value that may hold for all devices inside ExemptSet. Since this would lead to only two choices (e.g. per frame, frame type, overall), this can be indicated using a Boolean parameter.

In Summary:
SEC≥SEC$_B$(m,A)), where
SEC$_B$(m,A))=SEC$_B$(m) if A is not a member of ExemptSet.
SEC$_B$(m,A))=SEC$_B$(m) if A is a member of ExemptSet and Override parameter OverrideSEC(m) for message m is set to FALSE.
SEC$_B$(m,A))=ExemptSEC$_B$(m) if A is a member of ExemptSet and Override parameter OverrideSEC(m) for message m is set to TRUE.

In general, the most practical scenario is where ExemptSEC$_B$(m) is set to 'no security'.

It is noted that one scenario allows devices that do not have a key yet (e.g., because these just joined the network and still have to set up a key, e.g., via key agreement or key transport protocol or PIN or any other mechanism) to "by-pass" the minimum security level check (i.e., the security check always succeeds), if these have been labeled by recipient B as belonging to ExemptSet (and Exempt SEC$_B$(m) is set to 'no security').

The by-passing of minimum security level checks may depend on the message m received, the frame type of message m (which is visible to the recipient if the frame type of m is included in the transmitted frame—normally frame types and other frame control information is not encrypted), or a parameter that can be set via the Override parameter OverrideSEC(m).

It is also noted that operations on the set ExemptSet by the recipient effectively govern the operation of the minimum security level check (inclusion of a device in that set may allow by-passing or lowered security requirements, while exclusion of a device from that set restores the ordinary minimum security level check and make it applicable (possibly again) to the originating device in question).

Thus, the above allows a flexible mechanism to take into account transitionary behaviour of a correspondent (and their device) during the system's lifetime, and facilitates the transgression of a device from some initial stage where it does not yet have a key, to the stage where it has established a key and can be enforced to adhere to normal strict minimum security level policies.

The override parameter OverrideSEC(m) allows fine-tuning of "by-passing" the minimum security level check and make this dependent on the message m received (or message type—obviously one can make granularity as fine-grained as possible, at expense of table implementation cost). As an example, in the scenario where a device joins a network and still has to set up a key, one could set the Override parameter to TRUE only for those messages or message types minimally required for the originating device A to set up a key with the recipient device B (or with some other device T in the network that could notify B once the key has been established), thus restricting the permissible behavior of device A, but not ruling out all behaviors. This can also be used for any other initialization procedure or set-up procedure and should not be limited to key set up.

Again, operations on the Override parameter Override(m) by the recipient B allow for a very flexible and low-cost fine-tuning of security control policies. As an example, by setting all Override parameters to FALSE, one effectively closes down all network operations to devices that do not have a key (since all cryptographically unsecured messages to recipient B will ultimately be rejected)—the so-called stealth mode—while setting all Override parameters to TRUE allows unlimited flows of unsecured information to device B, since this may result in the minimum security level test to be effectively by-passed.

It will be recognized that the security rules can be adapted to provide flexibility not only on a frame-by-frame basis but also based on the frame type such that a policy check can determine if certain security rules or key types can be used with a particular frame type.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method of communicating between a first correspondent and a second correspondent in a data communication system, the method performed on a frame-by-frame basis and comprising:
assembling a data stream at said first correspondent, said data stream having at least one frame, said frame having a header and data;
determining a security level for a frame type of said frame based on a policy, wherein the policy identifies a minimum security level for the frame type;
incorporating in said header, an indication of said frame type and an indication of said security level;

forwarding said frame to said second correspondent to enable said second correspondent to determine the acceptability of said frame according to said frame type;

receiving, from said second correspondent, a frame including security bits that identify a security level for said received frame;

determining a minimum security level based on a frame type of said received frame and the policy;

if said security level for said received frame meets said minimum security level for said received frame, accept said received frame; and if said security level for said received frame does no meet the minimum security level for said received frame, reject said received frame.

2. The method according to claim 1 further comprising said second correspondent:

receiving said frame;

determining said frame type from said header; and correlating said frame type to said policy to determine if said frame type is acceptable for at least one attribute of said frame.

3. The method according to claim 2 further comprising accepting said frame is said policy is met, and rejecting said frame otherwise.

4. The method according to claim 2 wherein said header includes a representation of a key and said policy indicates an acceptable frame type for said key.

5. The method according to claim 2 wherein said header includes an indication of a security level and said policy indicates an acceptable frame type for said security level.

6. The method according to claim 2 wherein said policy indicates frame types vulnerable to an attack where one or more combinations of security features of said frame are present, said method comprising rejecting said frame if one of said combinations is found.

7. The method according to claim 2 wherein said frame includes one or more security bits indicative of a security level, and said method comprises said second correspondent extracting said security bits to determine said security level wherein said policy indicates whether or not said frame type is acceptable for said security level.

8. The method according to claim 2 wherein said policy comprises a look up table correlating said frame type to said at least one attribute.

9. The method according to claim 1 comprising anyone or both of encrypting said data and signing said data according to said security level.

10. The method according to claim 1 wherein said security level is a minimum acceptable security level and said minimum acceptable security level is independent of said data.

11. The method according to claim 1 wherein said security level is a minimum acceptable security level and said minimum acceptable security level is dependent on said data.

12. The method according to claim 11 wherein said data is anyone or both of encrypted and signed, said method comprising said second correspondent decrypting said data and/or authenticating said data according to said security bits.

13. The method according to claim 1 wherein said security level is a minimum acceptable security level and said minimum acceptable security level is partially data dependent such that said minimum acceptable security level differs according to said frame type.

14. The method according to claim 1 wherein said frame further comprises a footer comprising one or more bits representing an error code.

15. The method according to claim 1 wherein said header comprises a key identifier, a representation of a key corresponding to said key identifier, a security level, and an originator for determining the acceptability of said frame type.

16. A method of verifying a communication on a frame-by-frame basis between a first correspondent and a second correspondent in a data communication system comprising said second correspondent:

receiving from said first correspondent, a frame having a header and data, said header including an indication of a frame type and an indication of a security level for the frame;

determining said frame type from said header; and determining a minimum security level for said frame type based on a policy;

if said security level meets said minimum security level for said frame, accept said frame; and if said security level for said frame does not meet the minimum security level for said frame, reject said frame.

17. The method according to claim 16 further comprising accepting said frame is said policy is met, and rejecting said frame otherwise.

18. The method according to claim 16 wherein said header includes a representation of a key and said policy indicates an acceptable frame type for said key.

* * * * *

UNITED STATES PATENT AND TRADEMARK OFFICE
CERTIFICATE OF CORRECTION

| | |
|---|---|
| PATENT NO. | : 9,667,634 B2 |
| APPLICATION NO. | : 14/170213 |
| DATED | : May 30, 2017 |
| INVENTOR(S) | : Marinus Struik |

Page 1 of 1

It is certified that error appears in the above-identified patent and that said Letters Patent is hereby corrected as shown below:

In the Claims

Column 11, Line 14, Claim 1, replace "no" with --not--.

Signed and Sealed this
Second Day of July, 2019

Andrei Iancu
*Director of the United States Patent and Trademark Office*